(12) United States Patent
Click, Jr. et al.

(10) Patent No.: US 6,421,824 B1
(45) Date of Patent: Jul. 16, 2002

(54) METHOD AND APPARATUS FOR PRODUCING A SPARSE INTERFERENCE GRAPH

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/298,115

(22) Filed: Apr. 23, 1999

(51) Int. Cl.$^7$ .................................................. G06F 9/45
(52) U.S. Cl. ....................................................... 717/144
(58) Field of Search ............................ 717/9, 154, 144, 717/158, 159

(56) References Cited

U.S. PATENT DOCUMENTS 5,530,866 A * 6/1996 Koblenz et al. ............ 717/144
5,784,066 A * 7/1998 Aizikowitz et al. ......... 345/440
5,790,862 A * 8/1998 Tanaka et al. ................ 717/5
6,072,952 A * 6/2000 Janakiraman .................. 717/9

* cited by examiner

Primary Examiner—Kakali Chaki
Assistant Examiner—John Q. Chavis
(74) Attorney, Agent, or Firm—Beyer Weaver & Thomas LLP

(57) ABSTRACT

Methods and apparatus for reducing the number of edges described by an interference graph are disclosed. According to one aspect of the present invention, a computer-implemented method for allocating memory space in an object-based computing system includes obtaining source code that includes a code segment associated with a first variable and a code segment associated with a second variable. The method also includes binding the first variable to a specific register, and obtaining a live range for the second variable. Once the live range for the second variable is obtained, a register allocation is performed. Performing the register allocation includes creating an interference graph that includes a representation of the second variable and does not to include a representation of the first variable. In one embodiment, obtaining source code that includes the code segment associated with the first variable includes obtaining a call to a subroutine which includes the first variable as an argument in the call.

20 Claims, 7 Drawing Sheets

METHOD AND APPARATUS FOR PRODUCING A SPARSE INTERFERENCE GRAPH

BACKGROUND OF THE INVENTION

1. Field of Invention

The present invention relates generally to methods and apparatus for improving the performance of software applications. More particularly, the present invention relates to methods and apparatus for reducing the number of edges in an interference graph.

2. Description of the Related Art

In an effort to increase the efficiency associated with the execution of computer programs, many computer programs are "optimized." Optimizing a computer program generally serves to eliminate portions of computer code which are essentially unused. In addition, optimizing a computer program may restructure computational operations to allow overall computations to be performed more efficiently, thereby consuming fewer computer resources.

An optimizer is arranged to effectively transform or a computer program, e.g., a computer program written in a programming language such as C++, FORTRAN or Java bytecodes, into a faster program. The faster, or optimized, program generally includes substantially all the same, observable behaviors as the original, or pre-converted, computer program. Specifically, the optimized program includes the same mathematical behavior has its associated original program. However, the optimized program generally recreates the same mathematical behavior with fewer computations.

As will be appreciated by those skilled in the art, an optimizer generally includes a register allocator that is arranged to control the use of registers within an optimized or otherwise compiled, internal representation of a program. A register allocator allocates register space in which data associated with a program may be stored. A register is a location associated with a processor of a computer that may be accessed relatively quickly, as compared to the speed associated with accessing "regular" memory space, e.g., stack or heap space, associated with a computer.

Often, in order to allocate registers and stack slots, interference graphs are used to facilitate the allocation process. Interference graphs generally include a representation of a live range for each variable or value associated with a particular portion of code. A live range is generally a range in a portion of code over which a particular variable or value must remain accessible and available for use. A coloring process may be used on an interference graph to represent relationships between live ranges of variables represented in the interference graph, as will be appreciated by those skilled in the art.

Interference graphs are typically generated by a compiler during a process of compiling source code. FIG. 1 is a diagrammatic representation of a compiler with a register allocator. Source code 102 is provided as input to a compiler 106 which includes a register allocator 110. Compiler 106 may be an optimizing compiler, and is generally arranged to produce an internal representation 120 of source code 102. As shown, a live range 132 for a variable stored in "CX" overlaps a live range 134 for a variable stored in "DX." Accordingly, when register allocator 110 assigns registers to live ranges 132, 134, the registers must be assigned to prevent interference between the registers.

Source code 102 includes a call 140 to a subroutine. In general, calls are relatively common in source code, especially source code created in a computing language such as the C++ programming language or the Java™ programming language, developed by Sun Microsystems, Inc. of Palo Alto, Calif. Call 140 includes variables "CX" and "DX" as arguments. Specifically, call 140 is made with the contents of "CX" and "DX" as arguments. Typically, during register allocation, at least some of the variables associated with call 140 are bound to specific registers. In other words, no other variables may use the registers to which arguments associated with call 140 are bound. As will be appreciated by those skilled in the art, incoming parameters used by some methods may also be bound to specific registers.

The information provided in internal representation 120 may be used to create an interference graph of source code 102. With reference to FIG. 2, an interference graph created as a representation of source code 102 of FIG. 1 will be described. An interference graph 204 is created to represent live ranges and conflicts between live ranges with respect to register allocation. All variables associated with source code 102 of FIG. 1 are represented in interference graph 204. Nodes 208 represent live ranges for variables. By way of example, node 208d is arranged to indicate a live range for "CX," while node 208e is arranged to indicate a live range for "DX." It should be appreciated that a representation of the live range for a variable associated with "DX," which is bound to a specific real register, is included in interference graph 204.

Edges 212 drawn between two nodes 208 indicate that the two nodes 208 interfere. That is, edges 212 that are present between two nodes 208 are arranged to show that the variables associated with the two nodes 208 may not be stored in the same register, as they must be live simultaneously. For example, edge 212d between node 208d and node 208e indicates that contents of "CX" and contents of "DX" must be alive simultaneously and, as a result, interfere with each other, e.g., conflict with each other.

Building and manipulating, e.g., coloring, an interference graph in the course of performing a register allocation is intended to allow registers to be assigned to variables without conflicts. In general, the process of assigning registers to variables without interference, using an interference graph or other approach, is relatively complex. Interference graphs are often relatively large, and may require more than approximately 12 megabytes of memory space for a bit-set implementation when approximately 10,000 nodes are involved. Typically, for a bit-set implementation, each edge requires eight bytes. As source code that is provided to a compiler may often include thousands of variables, an interference graph which includes approximately 10,000 nodes may occur fairly frequently.

Interference graphs which occupy a relatively large amount of memory space tend to occupy memory space which would otherwise be available for other purposes. In addition, as creating and modifying an interference graph is a substantial part of an overall compilation process or, more specifically, a register allocation process, reducing the complexity associated with creating and modifying an interference graph may significantly affect the speed at which the overall compilation process may occur. Therefore, what is desired is a method and an apparatus for increasing the efficiency with which an interference graph. may be created and modified. That is, what is needed is a method and an apparatus for reducing the number of edges included in an interference graph without compromising the accuracy of a register allocation process.

SUMMARY OF THE INVENTION

The present invention relates to reducing the number of edges in an interference graph that is created for a register allocation process. According to one aspect of the present invention, a computer-implemented method for allocating registers in an object-based computing system includes obtaining source code that includes a code segment associated with a first variable and a code segment associated with a second variable. The method also includes obtaining a live range for the first variable and binding the first variable to a specific register, and obtaining a live range for the second variable. The representation of the second variable is then modified to exclude the specific register bound to the first variable form its potential allocation choices. Once the live range for the second variable is obtained and modified, a register allocation is performed. Performing the register allocation includes creating an interference graph that includes a representation of the second variable and does not to include a representation of the first variable. The representation of the second variable may be a representation of the live range for the second variable.

In one embodiment, obtaining source code that includes the code segment associated with the first variable includes obtaining a call to a subroutine which includes the first variable as an argument in the call. In another embodiment, obtaining the source code further includes obtaining a code segment associated with a third variable, in addition to obtaining a second live range that is associated with the third variable, and modifying that live range to exclude the specific register which was bound to the first variable from the choices available to the third variable. In such an embodiment, the interference graph includes a representation of the third variable, and performing the register allocation involves determining whether the first live range and the second live range overlap. When it is determined that the live ranges overlap, a coloring process is performed using the interference graph. Such a coloring process adds an indication, e.g., an edge, to the interference graph that indicates that the first live range and the second live range overlap.

By eliminating a representation of a variable that is bound to a register from an interference graph, the number of edges associated with the interference graph may be reduced. Reducing the number of edges increases the speed at which register allocation may occur. Since building and manipulating an interference graph is typically one of the most time-intensive part of an overall register allocation process, by reducing the number of edges in the interference graph, e.g., by keeping the interference graph sparse, the efficiency of the overall register allocation process may be improved.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

As a part of a register allocation process, an interference graph may be created and colored in order to allow registers and stack slots, as appropriate, to be assigned to variables without conflicts. Interference graphs are often relatively large, and the complexity of processes used to color the interference graphs typically increases as the size of the interference graphs increases. Interference graphs which occupy a relatively large amount of memory space tend to occupy memory space which would otherwise be available for other purposes. Further, building and coloring an interference graph is a significant part of a register allocation process. Therefore, reducing the complexity associated with building and coloring an interference graph may increase the speed of a compilation process.

In general, reducing the number of nodes and the number of edges included in an interference graph may increase the speed associated with the creation and the manipulation of the interference graph. One method for eliminating some edges from an interference graph involves identifying nodes associated with variables or values which are bound to registers. As will be appreciated by those skilled in the art, variables which are bound to registers, e.g., variables associated with calls to subroutines, may not interfere with other variables in the final allocation. Specifically, the live range of a variable, or a range over which a variable is defined and used, which is bound to a specific register must not interfere with a live range of any other variable if a coloring is to be achieved. Since source code often includes a substantial number of calls to subroutines, and the variables associated with calls to subroutines are generally bound to specific registers, the number of live ranges for such variables which may not interfere with other variables may be significant.

Since the live range of a variable which is bound to a register, i.e., a "bound" variable, may not interfere with the live range of any other variable, it is not necessary to include a representation of such a variable in an interference graph. By not including or otherwise eliminating the representation of such a variable from an interference graph, edges associated with the variable may generally be removed from the interference graph, thereby resulting in a relatively sparse interference graph. The processing of a sparse interference graph increases the speed at which an overall compilation, e.g., optimizing, process may occur.

Figure 1:
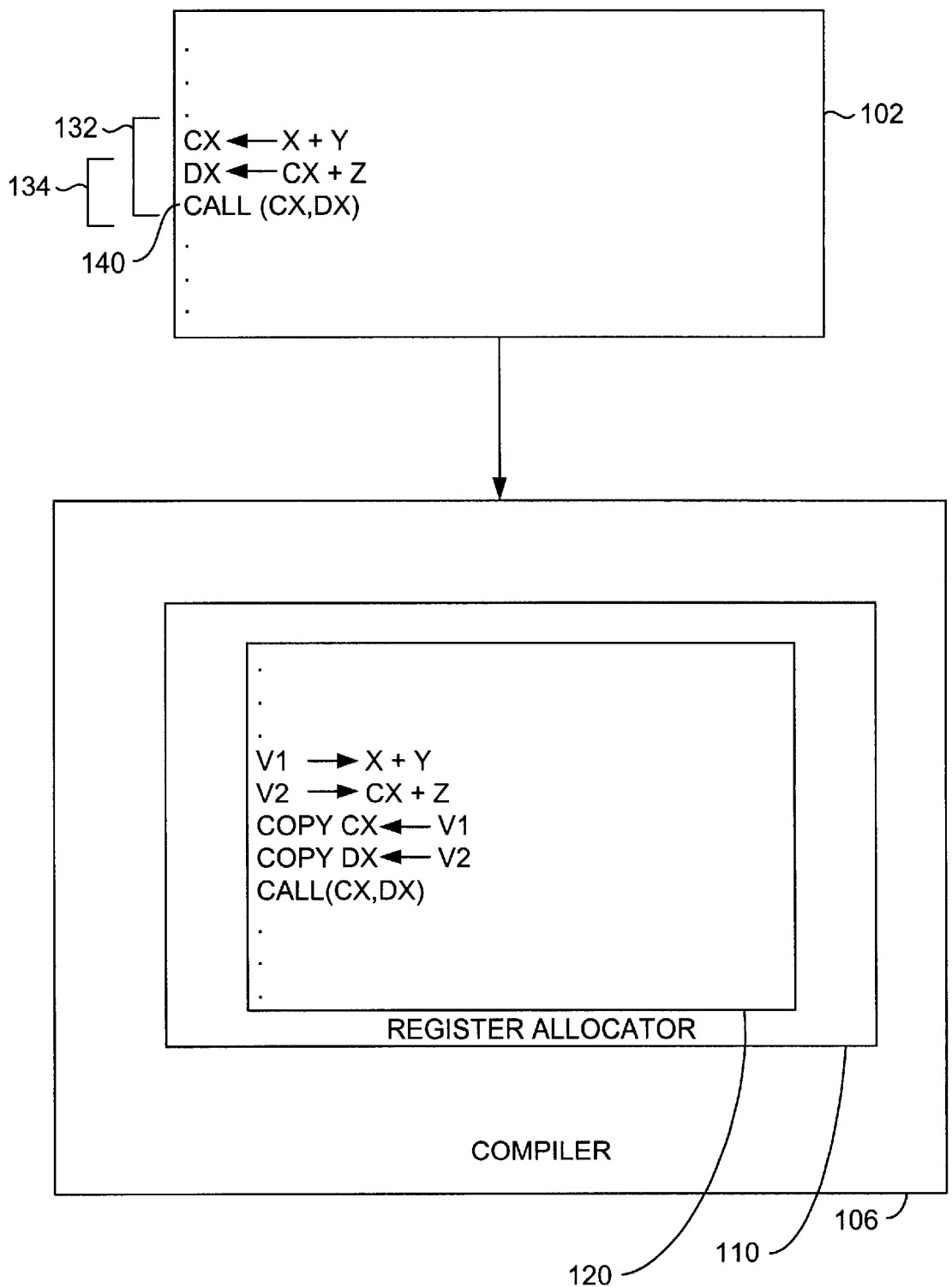
FIG. 1 is a diagrammatic representation of a compiler with a register allocator which is arranged to produce an internal representation of a segment of source code.
Figure 2:
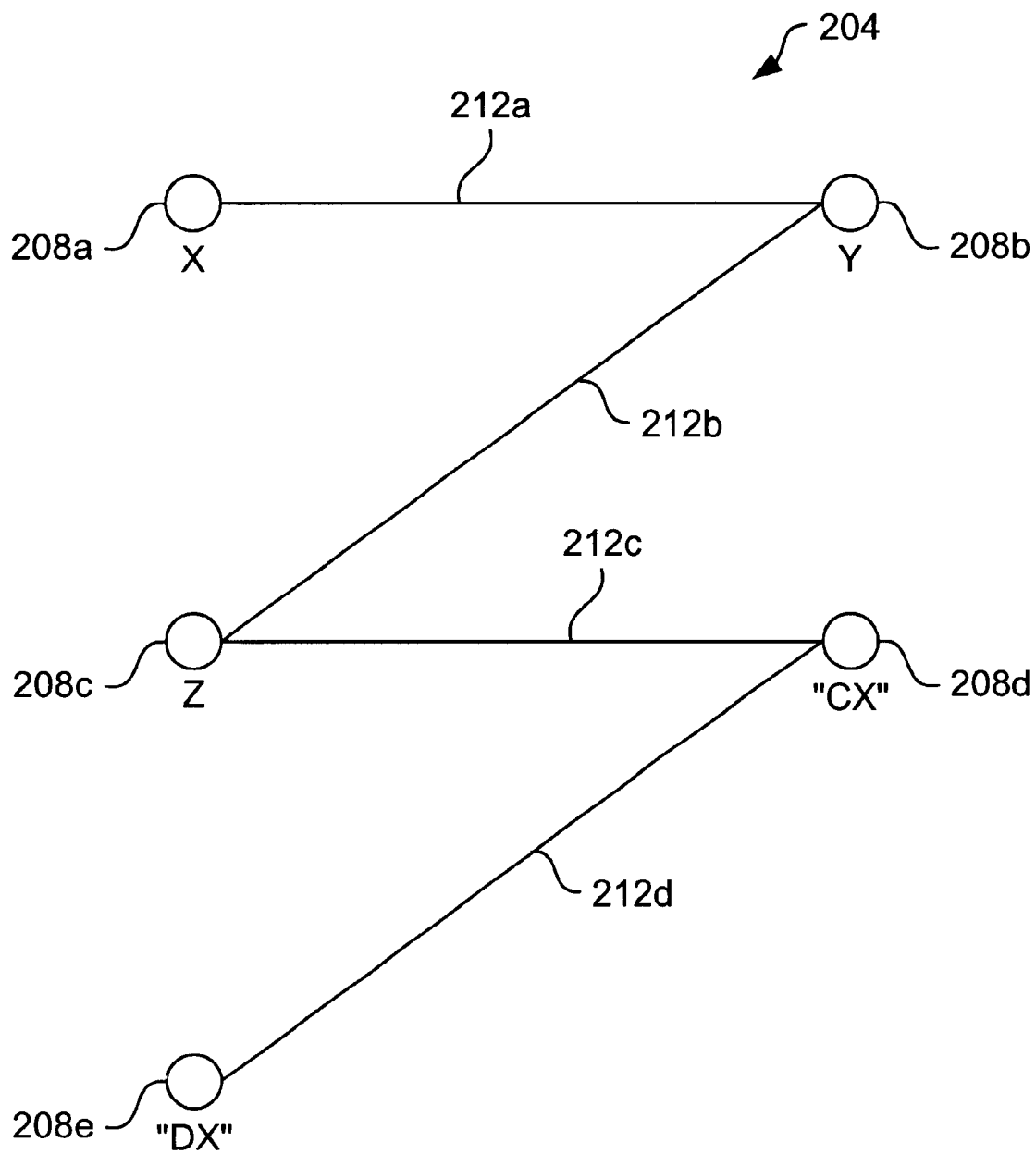
FIG. 2 is a diagrammatic representation of an interference graph for a segment of source code, i.e., segment 120 of source code 102 of FIG. 1.
Figure 3:
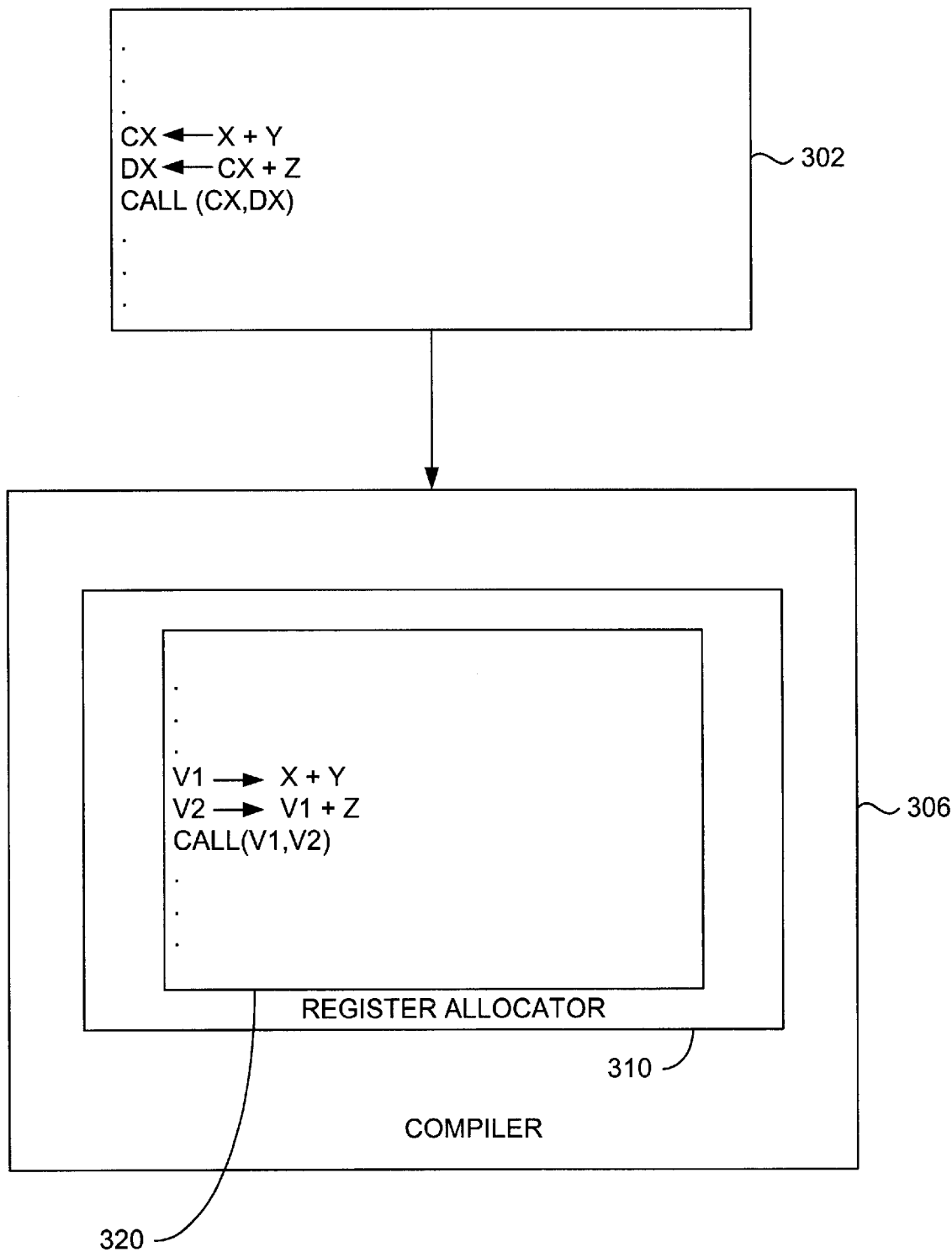
FIG. 3 is a diagrammatic representation of a compiler with a register allocator which is arranged to produce a simplified internal representation of a segment of source code in accordance with an embodiment of the present invention.

FIG. 3 is a diagrammatic representation of a compiler with a register allocator that is arranged to generate an interference graph which does not include representations of bound variables in accordance with an embodiment of the present invention. Source code 302 is provided as input to a compiler 306. In the described embodiment, compiler 306 is an optimizer that is arranged to optimize source code 302. Compiler 306 includes a register allocator 310 which is arranged to generate an internal representation 320 of source code 302. Internal representation 320 includes the same functionality as source code 302, and may be considered to be a mathematical computational equivalent of source code 302.

Source code 302 includes a call to a subroutine, and may be written in any suitable computing language including, but not limited to, the C++ programming language or the Java™ programming language, developed by Sun Microsystems, Inc. of Palo Alto, Calif. The call in the subroutine effectively includes the sum of variables "X" and "Y," as well as the sum of variables "X," "Y," and "Z." As will be appreciated by those skilled in the art, source code 302 typically includes many calls to subroutines.

In one embodiment, "DX" represents a variable which has an associated bound register. "DX" holds the sum of the contents of variable "CX" and variable "Z." A register mask, which is arranged to identify the register in which a variable or value may be stored, may be associated with virtual values "V1" and "V2" which represent the sum of variables "X" and "Y" and the sum of variables "X," "Y," and "Z," respectively. Register masks will be discussed below with reference to FIG. 5. A register mask may be used to indicate either a set of registers which may be associated with V1, or an actual register which is associated with V1, while another register mask may identify an actual register associated with V2.

Figure 4:
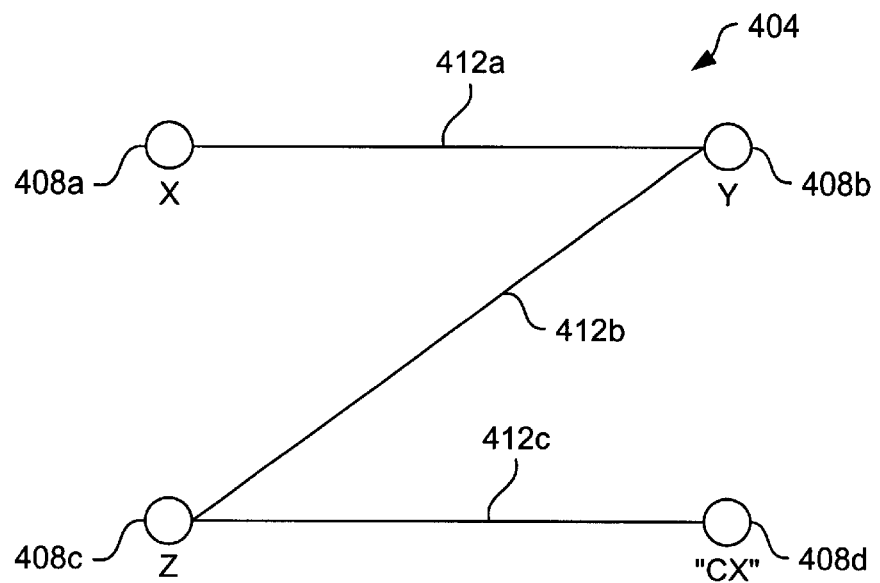
FIG. 4 is a diagrammatic representation of an interference graph for a segment of source code, i.e., segment 320 of source code 302 of FIG. 3, in accordance with an embodiment of the present invention.

Typically, the information provided in internal representation 320 may be used to create an interference graph for source code 302. Referring next to FIG. 4, an interference graph created as a representation of source code 302 of FIG. 3 will be described in accordance with an embodiment of the present invention. An interference graph 404 is arranged to represent live ranges of variables and conflicts between live ranges. Variables defined and used in source code 302 of FIG. 3 may be represented in interference graph 404. Nodes 408 are arranged to represent live ranges for variables.

As shown, edges 412 are included in interference graph 404 to indicate that live ranges interfere. In other words, edges 412 that are present between two nodes 408 are arranged to show that the variables associated with the two nodes 408 which have the potential of being stored in the same register should not be stored in the same register, as they must be live substantially simultaneously.

Figure 5:
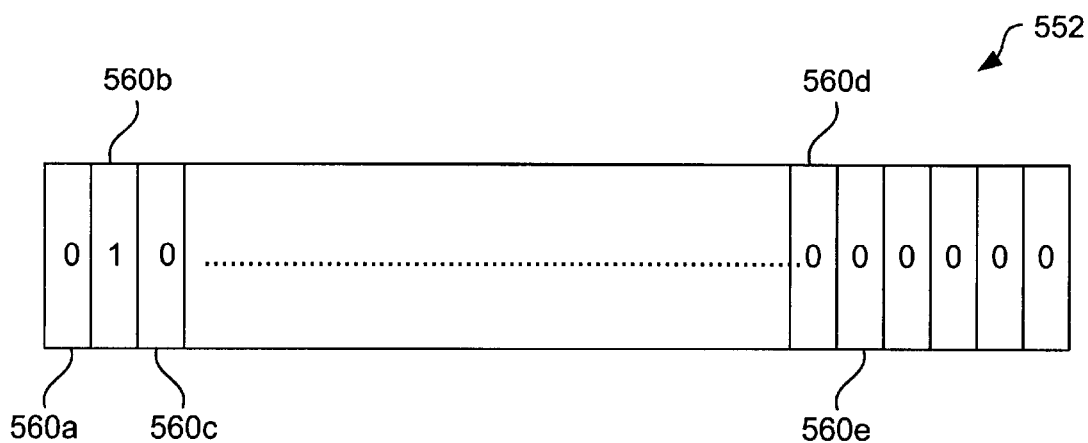
FIG. 5 is a diagrammatic representation of a register mask in accordance with an embodiment of the present invention.

In the described embodiment, a representation 420 of a live range of the value associated with "DX" is included as a part of interference graph 404, but no edges 412 may ever be associated with that live range 420. The value associated with variable 30 "DX" is bound to a register, e.g., register 560b as shown in FIG. 5. Accordingly, no other live range 408 may use register 560b, as it has been removed from the set of legal registers, as exemplified by a register mask as shown in FIG. 5, which will be described below, that are associated with all other live ranges 408. Eliminating register 560b from the register masks of all other live ranges prevents any edge 412 from substantially ever being inserted between any live range 408 and the "bound" live range 420, thereby simplifying interference graph 404.

As previously mentioned, a register mask may be set to identify the set of registers which may store a particular value. In general, register masks for two different variables may be studied to determine if live ranges for the variables interfere. FIG. 5 is a diagrammatic representation of a register mask in accordance with an embodiment of the present invention. A register mask 552 includes multiple bits 560. Each bit 560 is set to indicate whether a particular register is valid with respect to the variable with which register mask 552 is associated. The number of bits 560 is dependent, at least in part, upon the number of registers or stack slots that are associated with a particular processor. In the described embodiment, when a bit, e.g., bit 560b, is set to a value of "1," the implication is that the register associated with bit 560b is valid. Alternatively, when a bit, e.g., bit 560a, is set to a value of "0," the indication is that the associated register is not valid. In one embodiment, at most one bit 560 is set, i.e., set to "1," in register mask 552, since bits 560 represent single precision values such as integers or floats. In another embodiment, two bits 560 may be set, as for example when bits 560 represent long integers. In still another embodiment, many bits may be set to represent that any one of several registers is a valid choice.

Figure 6:
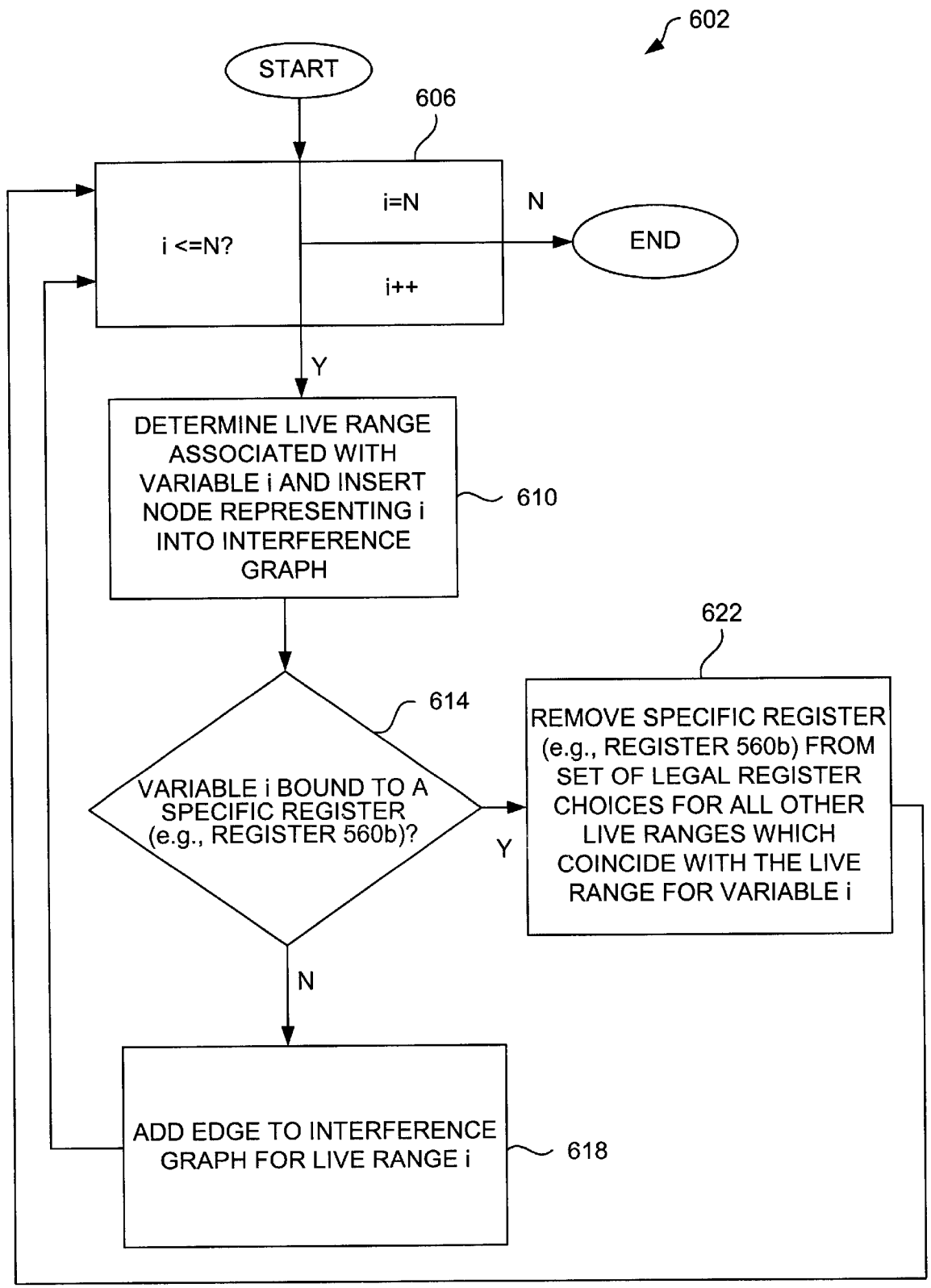
FIG. 6 is a process flow diagram which illustrates the steps associated with creating and manipulating an interference graph in accordance with an embodiment of the present invention.

With reference to FIG. 6, the steps associated with building and manipulating an interference graph will be described in accordance with an embodiment of the present invention. A process 602 of creating and manipulating an interference graph begins at step 606 where each variable associated with a particular piece of source code is processed. For each variable "i," a live range is determined, and a node representing that live range is inserted into the interference graph in step 610. Determining a live range for a variable typically involves identifying all the definitions and uses for that variable. Once a live range for variable "i" is determined and a corresponding node for the live range is inserted into the interference graph, then process flow moves to step 614 in which a determination is made as to whether variable "i" is required to be bound to a specific register.

As will be appreciated by those skilled in the art, some variables are bound, or otherwise assigned, to registers such that use of the registers by other live ranges which are substantially simultaneously live may not overlap. For example, variables which are included in calls to subroutines are often bound to specific registers. In some embodiments, incoming parameters to methods, are also bound to specific registers, as are variables which are defined by an instruction which may only use a single register such as the X86 idiv instruction for the Intel x86 family of processors.

When it is determined that variable "i" is not to be bound to a specific register, then in step 618, an edge is added to the interference graph for live range "i." Specifically, in the described embodiment, the set of legal register assignments associated with the live range for variable "i" is compared with the set of legal register assignments of all other live ranges for variables "j," which have already been inserted into the interference graph, and which are live substantially simultaneously with the variable "i". For each live range for a variable "j" which is found to have a set of legal register assignments which overlaps the set of legal register assignments for variable "i", an edge is inserted into the interference graph between the node which represents variable "i" and the node which represents variable "j".

Returning to step 614 and the determination of whether or not a variable "i" must be bound to a specific register, when the determination is that variable "i" must be bound to a specific register, then process flow proceeds to step 622 in which all variables "k" which are substantially simultaneously live with variable "i" have the specific register, e.g., register 560b of FIG. 5, which has heretofore been bound to variable "i" removed from their collection of legal register assignments. In other words, the specific register to which variable "i" has been bound is removed from lists of registers available to all live ranges which coincide with the live range for variable "i," i.e., which interfere with live range "i.", The methods used to bind variable "i" to a particular register may vary widely, as will be understood by those of skill in the art. Binding variable "i" to a register results in the live range for variable "i" being free of conflict or overlap with other variables. In other words, variables or values which are bound to a register may not interfere with other variables. Accordingly, since the live range for variable "i" does not interfere with the live range of any other variable, in the described embodiment, no edges which connect the node which represents variable "i" will be included in an interference graph.

By substantially eliminating the possibility of any edges being associated with the live ranges of the bound variables, the interference graph may be simplified, thereby enabling the register allocation process which uses the interference graph to be implemented in a faster, more efficient manner. Specifically, the time in which a register allocation process may occur is reduced.

After variable "i" is bound to a specific register, and its associated register, e.g., register 560b of FIG. 5, is removed from the set of legal register choices for all variables which are substantially simultaneously live in the program in step 622, process flow returns to step 606 in which another variable is processed. When it is determined in step 606 that no additional variables are to be processed, then the construction of the interference graph is completed.

Figure 7:
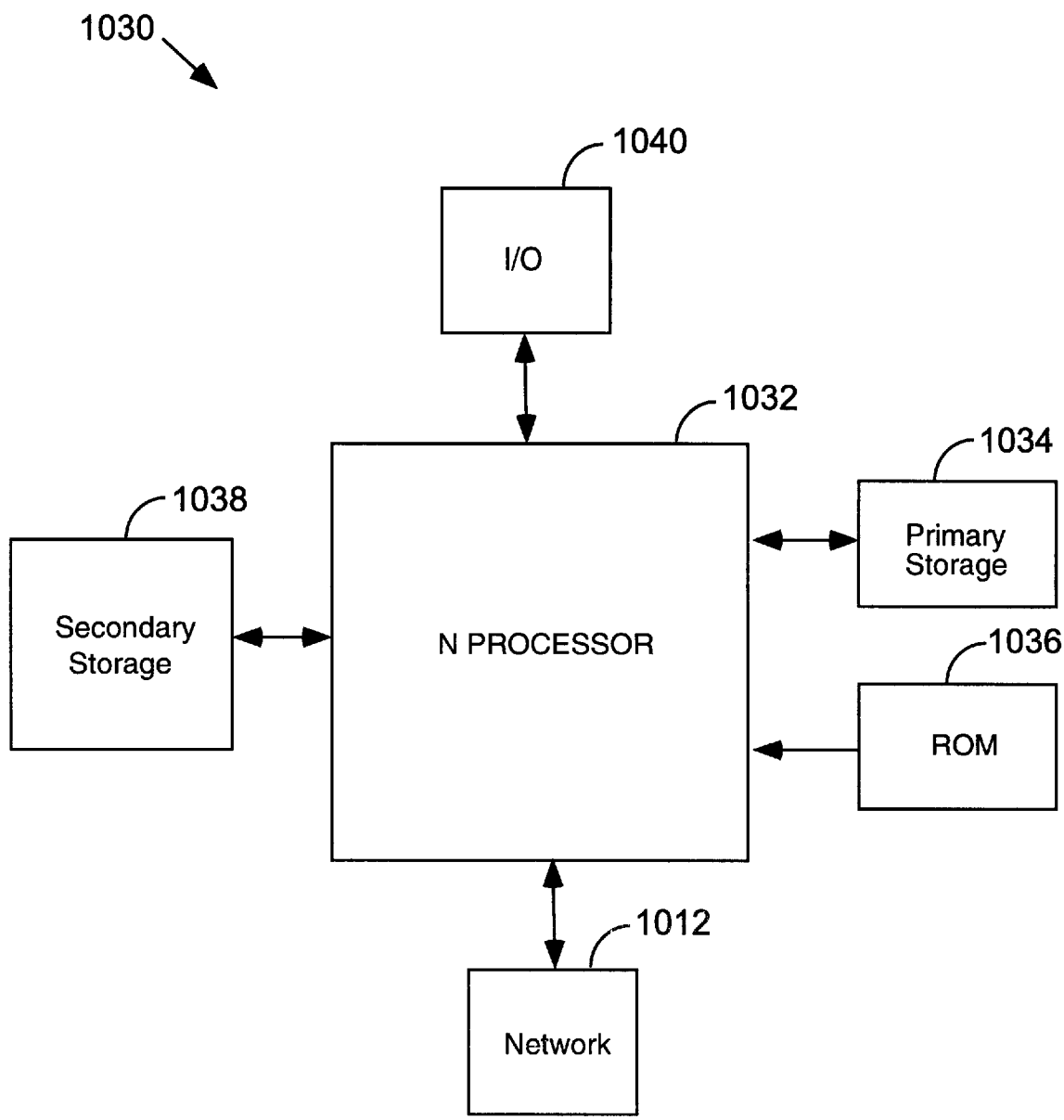
FIG. 7 is a diagrammatic representation of a general purpose computer system suitable for implementing the present invention.

FIG. 7 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 8. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 8:
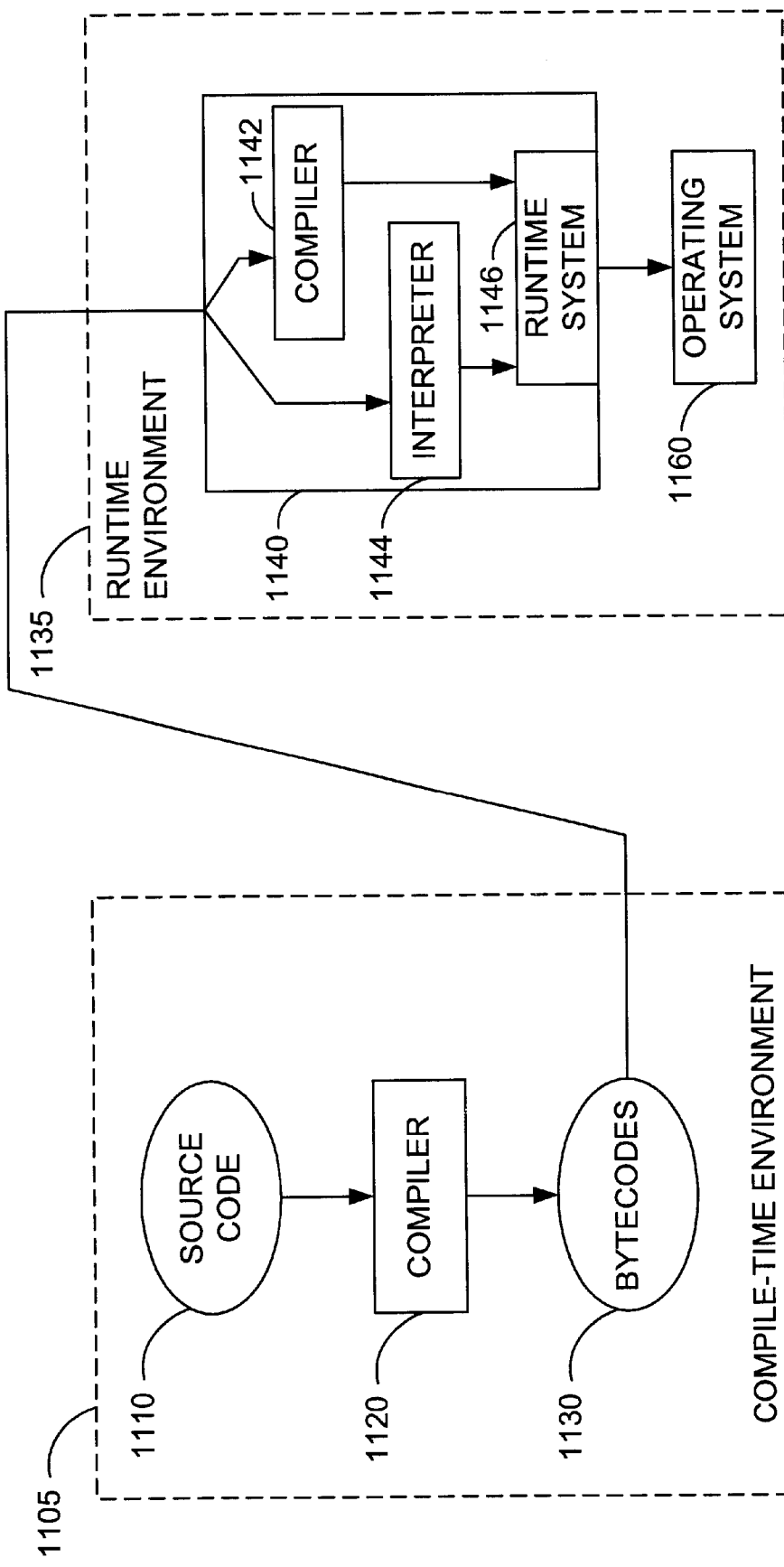
FIG. 8 is a diagrammatic representation of a virtual machine which is supported by the computer system of FIG. 7, and is suitable for implementing the present invention.

As previously mentioned, a virtual machine may execute on computer system 1030. FIG. 8 is a diagrammatic representation of a virtual machine which is supported by computer system 1030 of FIG. 7, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 7, or stored on a storage device such as primary storage 1034 of FIG. 7. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 7. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps associated with the creation of and the manipulation of an interference graph may be reordered, removed or added. In general, steps involved with the methods of the present invention may be reordered, removed, or added without departing from the spirit or the scope of the present invention.

While variables, or values, which are bound to specific registers have generally been described as being associated with calls to subroutines and input parameters for some methods, it should be appreciated that variables may be bound to registers for a variety of different reasons. For instance, in some embodiments, a variable may be bound to a register in order to assure that the variable is accessible throughout the execution of a computer program.

The binding of values to specific registers has been described. As the number of registers associated with a processor is fixed, in some cases, the number of values which are suitable for binding to registers may exceed the number of available registers. In such cases, the values may be bound to specific stack slots in lieu of registers. Such stack slots may be allocated using substantially any suitable method. In one embodiment, stack slots may be allocated by a register allocater in the same manner as registers are allocated, as described in U.S. patent application Ser. No. 09/298,318 (Atty. Docket No. SUN1P230/P3910), filed concurrently herewith, which is incorporated herein by reference in its entirety.

The number of bits associated with a register mask may generally be widely varied, depending, for example, upon the platform with which the register mask is associated. Although the present invention has been described as being suitable for use with an Intel platform, the present invention may be implemented for use with substantially any suitable platform including, but not limited to, a Power PC platform and a Sparc platform. Therefore, the present examples are to be considered as illustrative and not restrictive, and the invention is not to be limited to the details given herein, but may be modified within the scope of the appended claims.

What is claimed is:

1. A computer-implemented method for allocating memory space in an object-based computing system, the computer-implemented method comprising:
    obtaining source code, the source code including a code segment associated with a first variable, the source code further including a code segment associated with a second variable;
    binding the first variable to a first register;
    obtaining a first live range, the first live range being associated with the second variable; and
    performing a register allocation, wherein performing the register allocation includes creating an interference graph, the interference graph being arranged to include a representation of the second variable, the interference graph further being arranged not to include a representation of the register bound to the first variable.

2. A computer-implemented method as recited in claim 1 wherein obtaining source code including the code segment associated with the first variable includes obtaining a call to a subroutine, the call to the subroutine including the first variable as an argument in the call.

3. A computer-implemented method as recited in claim 1 wherein obtaining source code including the code segment associated with the first variable includes obtaining a function, the function including the first variable as an incoming parameter to the function.

4. A computer-implemented method as recited in claim 1 wherein obtaining the source code further includes obtaining a code segment associated with a third variable, the computer-implemented method further including:
    obtaining a second live range, the second live range being associated with the third variable.

5. A computer-implemented method as recited in claim 4 wherein the interference graph is further arranged to include a representation of the third variable, and performing the register allocation further includes:
    determining whether the first live range and the second live range at least partially overlap; and
    performing a coloring process on the interference graph, wherein performing the coloring process on the interference graph includes adding an indication to the interference graph when it is determined that the first live range and the second live range at least partially overlap, the indication being arranged to indicate that the first live range and the second live range at least partially overlap.

6. A computer-implemented method as recited in claim 5 wherein performing the register allocation further includes:
    assigning a second register to the second variable; and
    assigning a third register to the third variable, wherein assigning the second register to the second variable includes removing the second register from a list of available registers for the third variable.

7. A computer-implemented method as recited in claim 5 wherein performing the register allocation further includes:
    assigning a second register to the second variable; and
    assigning a stack slot to the third variable, wherein assigning the second register to the second variable includes removing the second register from a list of available registers and stack slots for the third variable.

8. A computer-implemented method as recited in claim 5 wherein performing the register allocation further includes:
    assigning a first stack slot to the second variable; and
    assigning a second stack slot to the third variable.

9. A computer-implemented method as recited in claim 1 farther including obtaining a second live range, the second live range being associated with the first variable, wherein the first live range and the second live range at least partially overlap.

10. A computer system arranged to allocate memory space, the computer system comprising:
    a processor;
    a source code input mechanism arranged to obtain source code, the source code including a code segment associated with a first variable, the source code further including a code segment associated with a second variable;
    a binding mechanism arranged to bind the first variable to a first register, the first register being associated with the processor;
    a live range identifier arranged to obtain a first live range, the second live range being associated with the second variable; and a register allocator, the register allocator being arranged to create an interference graph, the interference graph being arranged to include a representation of the second variable, the interference graph further being arranged not to include a representation of the register bound to the first variable.

11. A computer system according to claim 10 wherein the source code input mechanism is further arranged to obtain a call to a subroutine included in the code segment associated with the first variable, the call to the subroutine including the first variable as an argument in the call.

12. A computer system according to claim 10 wherein the source code input mechanism is further arranged to obtain a function included in the code segment associated with the first variable, the function including the first variable as an incoming parameter to the function.

13. A computer system according to claim 10 wherein the source code input mechanism is further arranged to obtain a code segment associated with a third variable and the live range identifier is further arranged to obtain a second live range, the second live range being associated with the third variable.

14. A computer system according to claim 13 wherein the interference graph is further arranged to include a representation of the third variable and the register allocator includes:

a determinator arranged to determine whether the first live range and the second live range at least partially overlap; and a colorer arranged to perform a coloring process on the interference graph by adding an indication to the interference graph when it is determined that the first live range and the second live range at least partially overlap, the indication being arranged to indicate that the first live range and the second live range at least partially overlap.

15. A computer program product for allocating memory space in an object-based computing system, the computer program product comprising:

computer code that obtains source code, the source code including a code segment associated with a first variable, the source code further including a code segment associated with a second variable;

computer code that binds the first variable to a first register;

computer code that obtains a first live range, the second live range being associated with the second variable;

computer code that performs a register allocation, wherein the computer code that performs the register allocation includes computer code that creates an interference graph, the interference graph being arranged to include a representation of the second variable, the interference graph further being arranged not to include a representation of the register bound to the first variable; and a computer readable medium that stores the computer codes.

16. A computer program product according to claim 15 wherein the computer readable medium is one selected from the group consisting of a data signal embodied in a carrier wave, a floppy disk, a CD-ROM, a tape drive, an optical drive, flash memory, and a hard drive.

17. A computer program product according to claim 15 wherein the computer code that obtains source code including the code segment associated with the first variable includes computer code that obtains a call to a subroutine, the call to the subroutine including the first variable as an argument in the call.

18. A computer program product according to claim 15 wherein the computer code that obtains source code including the code segment associated with the first variable includes computer code that obtains a function, the function including the first variable as an incoming parameter to the function.

19. A computer program product according to claim 15 wherein the computer code that obtains the source code further includes computer code that obtains a code segment associated with a third variable, the computer program product further including:

computer code that obtains a second live range, the second live range being associated with the third variable.

20. A computer program product according to claim 19 wherein the computer code that creates the interference graph is arranged to include a representation of the third variable in the interference graph, and the computer code that performs the register allocation further includes:

computer code that determines whether the first live range and the second live range at least partially overlap; and computer code that performs a coloring process on the interference graph, wherein the computer code that performs the coloring process on the interference graph includes computer code that adds an indication to the interference graph when it is determined that the first live range and the second live range at least partially overlap, the indication being arranged to indicate that the first live range and the second live range at least partially overlap.

* * * * *